(12) United States Patent
Inoe et al.

(10) Patent No.: US 11,048,968 B2
(45) Date of Patent: Jun. 29, 2021

(54) PLACEMENT DETECTION SYSTEM

(71) Applicant: Panasonic Intellectual Property Management Co., Ltd., Osaka (JP)

(72) Inventors: Masanobu Inoe, Osaka (JP); Yuki Kobayashi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/795,871

(22) Filed: Feb. 20, 2020

(65) Prior Publication Data

US 2020/0202165 A1  Jun. 25, 2020

Related U.S. Application Data

(63) Continuation of application No. PCT/JP2018/026974, filed on Jul. 18, 2018.

(30) Foreign Application Priority Data

Sep. 29, 2017 (JP) .............................. JP2017-189357

(51) Int. Cl.
*G06K 9/00* (2006.01)
*G06K 9/62* (2006.01)
*G06K 9/20* (2006.01)
*G06K 9/32* (2006.01)

(52) U.S. Cl.
CPC ......... *G06K 9/6215* (2013.01); *G06K 9/2054* (2013.01); *G06K 9/3275* (2013.01)

(58) Field of Classification Search
None
See application file for complete search history.

(56) References Cited

U.S. PATENT DOCUMENTS 10,424,051 B2 * 9/2019 Mori ................. G06T 5/002
2004/0264805 A1   12/2004 Harada et al.

FOREIGN PATENT DOCUMENTS

JP   2004-274198   9/2004

* cited by examiner

*Primary Examiner* — Soo Jin Park
(74) *Attorney, Agent, or Firm* — Wenderoth, Lind & Ponack, L.L.P.

(57) ABSTRACT

A placement detection system includes: a placement table; an imaging device that images an object placed on the placement table through the placement table to generate an input image; and a control device that receives the input image. The control device identifies a higher-level pixel having a pixel level higher than or equal to a predetermined pixel level in the input image, sets a threshold value of the higher-level pixel, and sets a threshold value of a target pixel other than the higher-level pixel to a lower value than the threshold value of the higher-level pixel in accordance with a distance between the higher-level pixel and the target pixel. The control device binarizes a pixel level of the target pixel in accordance with the threshold value of the target pixel to produce a binarized image and detects a shape of the object by using the binarized image.

6 Claims, 10 Drawing Sheets

PLACEMENT DETECTION SYSTEM

BACKGROUND

1. Technical Field

The present disclosure relates to a placement detection system that binarizes an imaged image to detect a shape of a placed object.

2. Description of the Related Art

Patent literature (PTL) 1 discloses a flatbed image reading control device including an original table on which an original is placed and an original table cover for covering the original table. The image reading control device includes: a means that binarizes a read image data to extract a rectangular region including a region where the original is present; a skew detecting means that detects skew of the rectangular region; a skew correcting means that corrects the skew of the rectangle in accordance with the detected skew; a clipping width setting means that sets a clipping width on each side of the rectangle in accordance with the detected skew; and a clipping means that cuts a periphery of the rectangular region based on the set clipping width for each side to obtain an original image. This way, it is possible to improve clipping precision of an original portion.

PTL 1 is Unexamined Japanese Patent Publication No. 2004-274198.

SUMMARY

The present disclosure provides a placement detection system effective at detecting a shape of an object placed in a placement region while lightening user's operational burden such as holding down the object with a cover or the like for covering the placement region.

The placement detection system according to the present disclosure includes: a placement table; an imaging device that images an object placed on the placement table through the placement table to generate an input image; and a control device that receives the input image. The control device identifies a higher-level pixel having a pixel level higher than or equal to a predetermined pixel level in the input image, sets a threshold value of the higher-level pixel, and sets a threshold value of a target pixel other than the higher-level pixel to a lower value than the threshold value of the higher-level pixel in accordance with a distance between the higher-level pixel and the target pixel. Then, the control device binarizes a pixel level of the target pixel in accordance with the threshold value of the target pixel to produce a binarized image and detects a shape of the object by using the binarized image.

The placement detection system according to the present disclosure can detect the shape of the object placed in the placement region while lightening user's operational burden such as holding down the object with the cover or the like for covering the placement region.

DETAILED DESCRIPTION

An exemplary embodiment is described in detail below with reference to the drawings as appropriate. In some cases, however, the exemplary embodiment may not be described in more detail than necessary. For example, well-known matters may not be described in detail and substantially the same structures may not be described repeatedly in some cases. This is for preventing the following description from becoming unnecessarily redundant and for making the description easily understandable to a person skilled in the art.

The accompanying drawings and the following description are provided so that the person skilled in the art can fully understand the present disclosure and are not intended to limit a subject described in the claims.

Exemplary Embodiment

Figure 1A:
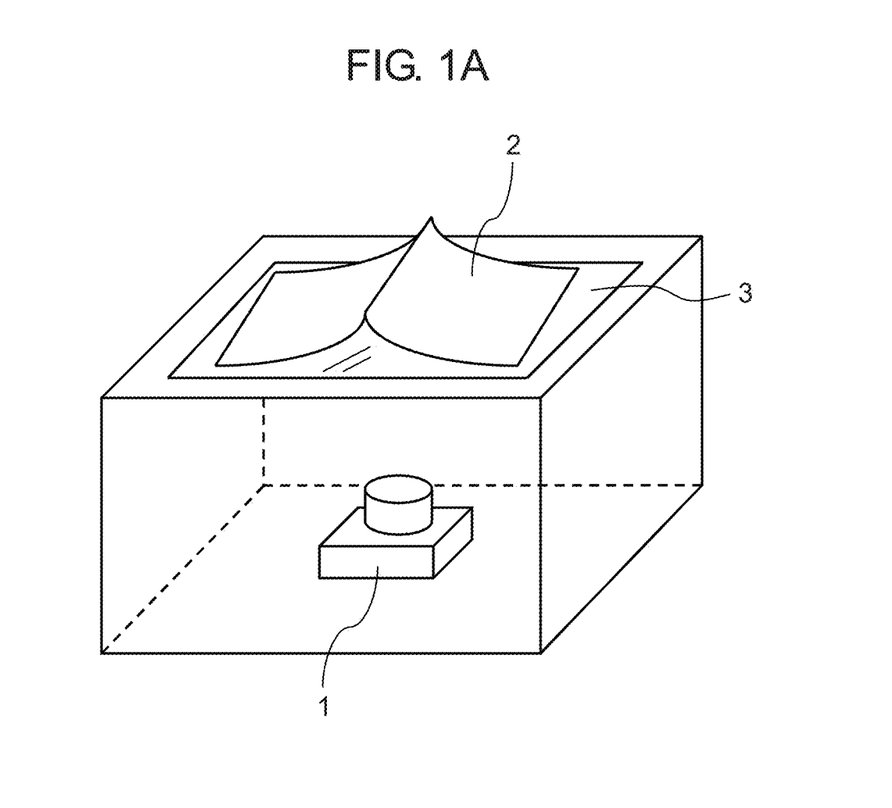
FIG. 1A is an outer appearance view of an example of a placement detection system according to the present disclosure.
Figure 1B:
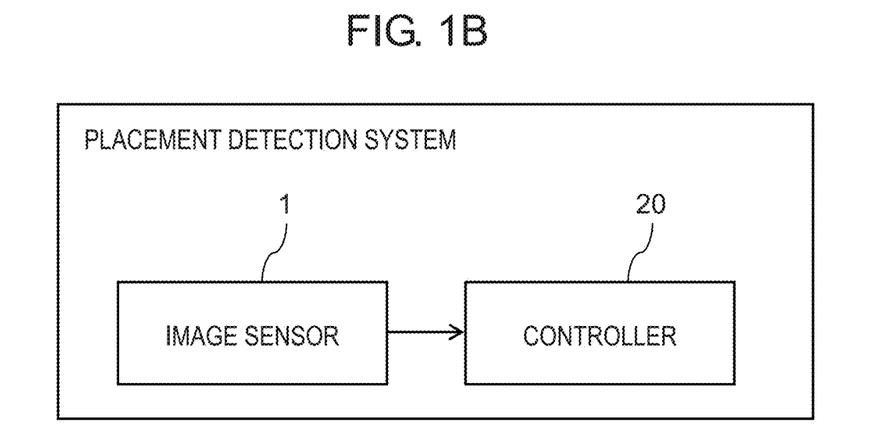
FIG. 1B is a block diagram showing an image sensor and a controller according to the present disclosure.

FIG. 1A is an outer appearance view of an example of a placement detection system according to the present disclosure. FIG. 1B is a block diagram showing an image sensor and a controller according to the present disclosure.

The placement detection system has image sensor 1, placement table 3, and controller 20. Here, image sensor 1 is an example of an imaging device that images passport 2 (an example of an object) placed on placement table 3 through the placement table 3 to generate an input image. Controller 20 is an example of a control device that receives the input image.

Placement table 3 is a transparent glass plate, for example. Passport 2 is placed on placement table 3. Image sensor 1 images a glass surface of placement table 3, that is, placement region 4 (see FIG. 3) from below placement table 3. Image sensor 1 is a complementary metal oxide semiconductor (CMOS) image sensor, a charge coupled device (CCD) image sensor, or the like, for example.

The input image generated by image sensor 1 is sent to controller 20. Controller 20 determines whether the target object is placed on placement table 3 by using the input image. Controller 20 is formed by a central processing unit (CPU), memories (a read-only memory (ROM), random-access memory (RAM)), and the like. Functions of controller 20 described below are implemented by the CPU of controller 20 by running a program stored in the memories of controller 20, for example.

Figure 2:
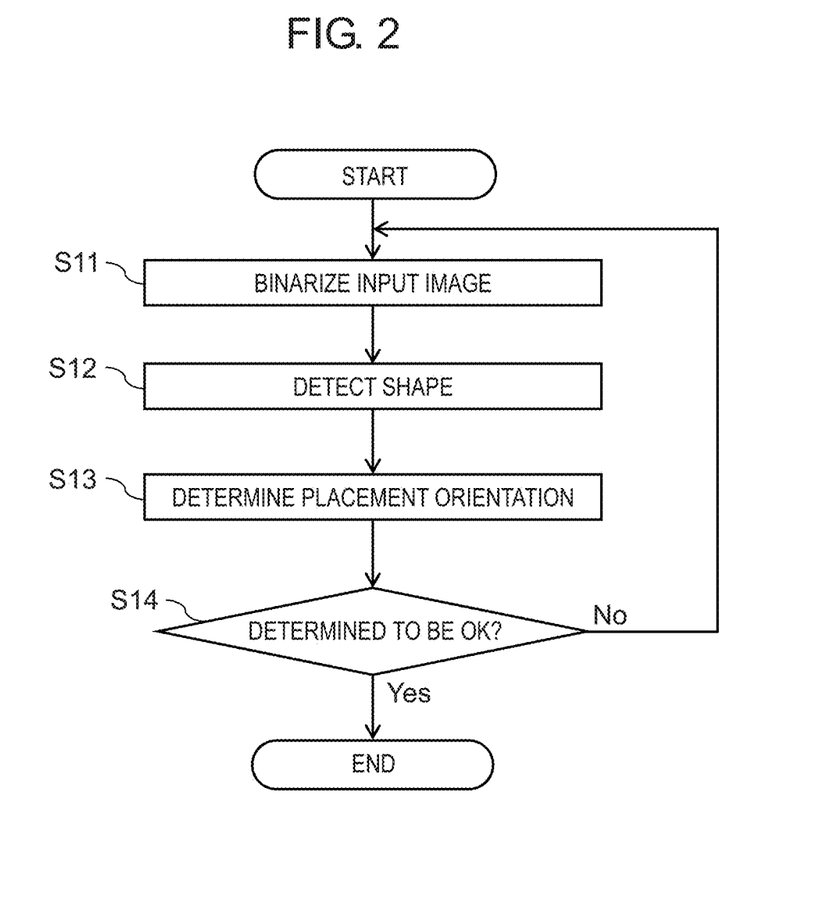
FIG. 2 is a flowchart showing an example of an operation of the placement detection system.

FIG. 2 is an operation flowchart of the placement detection system.

First, controller 20 binarizes the input image from image sensor 1 in accordance with a predetermined threshold value and generates an image that is binarized (binarized image) (S11).

Next, controller 20 detects a shape of passport 2 by using the binarized image (S12).

Based on a detection result in S12, controller 20 determines whether passport 2 is placed in a predetermined placement orientation (S13). If a determination result is "Yes", passport 2 is regarded as being placed in the target placement orientation and placement detection processing is ended. If the determination result is "No", the processing returns to a start of the operation flowchart to repeat the placement detection (S14).

Figure 3:
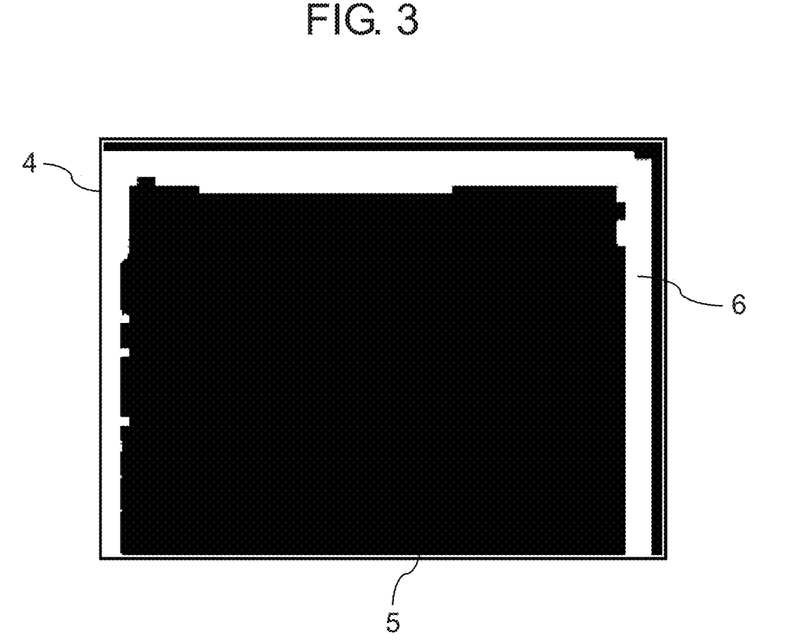
FIG. 3 is an explanatory view of an example of a binarized image of a passport that is placed in a landscape orientation.

FIG. 3 is an explanatory view of an example of the binarized image of passport 2 that is placed in a landscape orientation and shows the example of the image after binarization processing in S11 in FIG. 2.

In the binarization processing, pixels having pixel levels lower than or equal to the predetermined threshold value are expressed as black pixels and pixels having pixel levels higher than the predetermined threshold value are expressed as white pixels. In the binarized image, passport 2 placed in placement region 4 has low pixel levels and therefore passport region 5 is expressed with the black pixels. Background region 6 not covered with passport 2 has higher pixel levels and therefore background region 6 is expressed with the white pixels. Here, the pixel levels of the respective pixels of the input image range from 0 to 255, for example. If the predetermined threshold value is 40, the pixels having the pixel levels lower than or equal to 40 are the black pixels and the pixels having the pixel levels higher than 40 are the white pixels in the binarization processing. Here, the pixel level refers to a value indicating brightness of each of the pixels of the input image.

Figure 4:
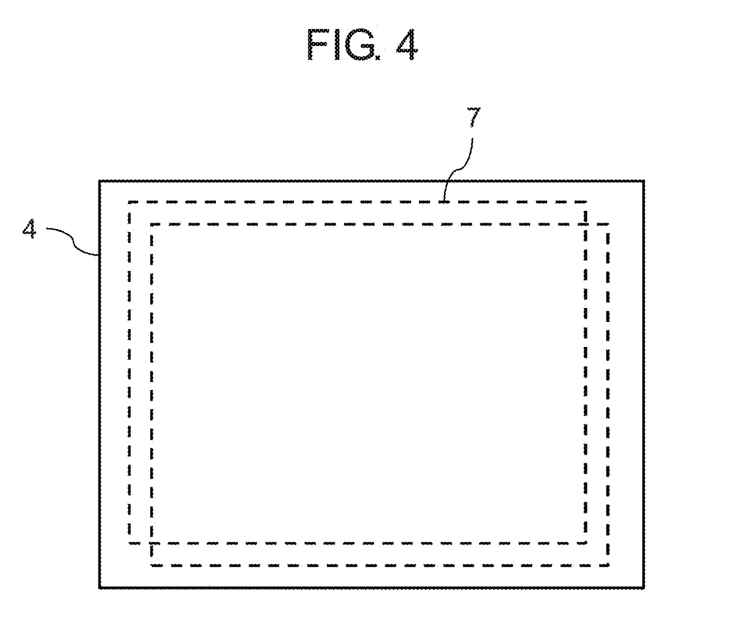
FIG. 4 is an explanatory view of an example of a method of detecting the passport that is placed in the landscape orientation.

FIG. 4 is an explanatory view of an example of a method of detecting passport 2 that is placed in the landscape orientation. With reference to FIG. 4, operations in S12 and S13 in FIG. 2 are described.

In placement region 4, controller 20 detects the shape of passport 2 while moving passport detection frame 7 for detecting a state of landscape-oriented placement of passport 2. To put it concretely, controller 20 detects a place of the binarized image a higher proportion of which is occupied by the black pixels in passport detection frame 7. Controller 20 determines whether the proportion of the detected position occupied by the black pixels is higher than or equal to a predetermined proportion. This way, controller 20 determines the placement orientation of passport 2. Here, the predetermined proportion is 90%, for example. At this time, controller 20 determines that passport 2 is placed in the landscape orientation in placement region 4 if the proportion of an inside of passport detection frame 7 occupied by the black pixels is 90% or higher.

The present exemplary embodiment is further described below with reference to FIGS. 5 to 12.

[1-1. Problem Caused by Outside Light]

Figure 5:
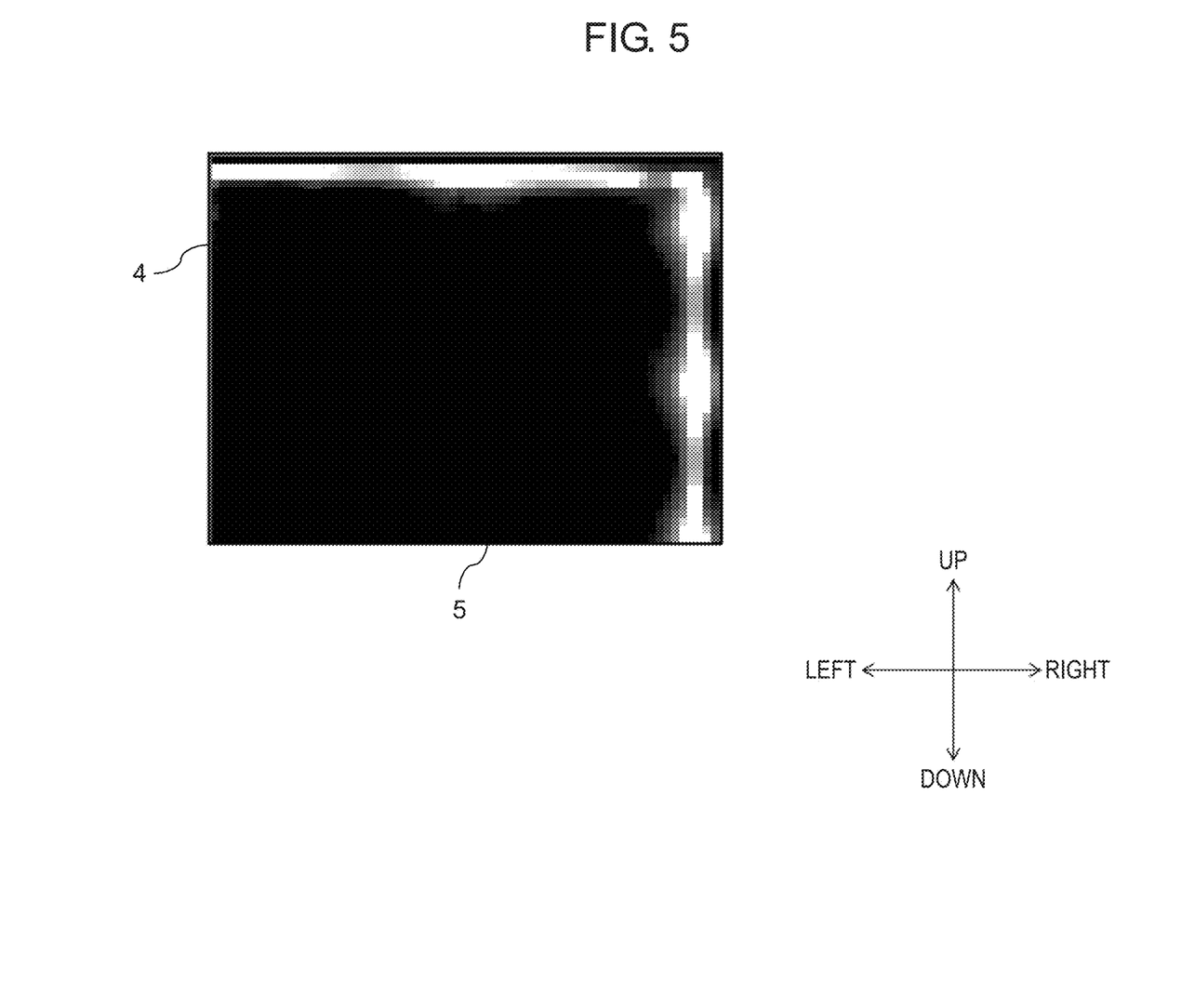
FIG. 5 is a view of an example of an input image from the image sensor with an outside light captured.

FIG. 5 is a view of an input image generated by image sensor 1 with an outside light captured.

Passport 2 is placed in placement region 4. The outside light is captured in an upper central portion and a right portion of passport region 5. As shown in FIG. 5, in the input image from image sensor 1, the region where the outside light is captured has higher pixel levels than passport region 5. Therefore, pixels around the region where the outside light is captured also has higher pixel levels. Here, the outside light refers to sunlight, a higher-illumination light disposed on a ceiling, and the like, for example.

Figure 6:
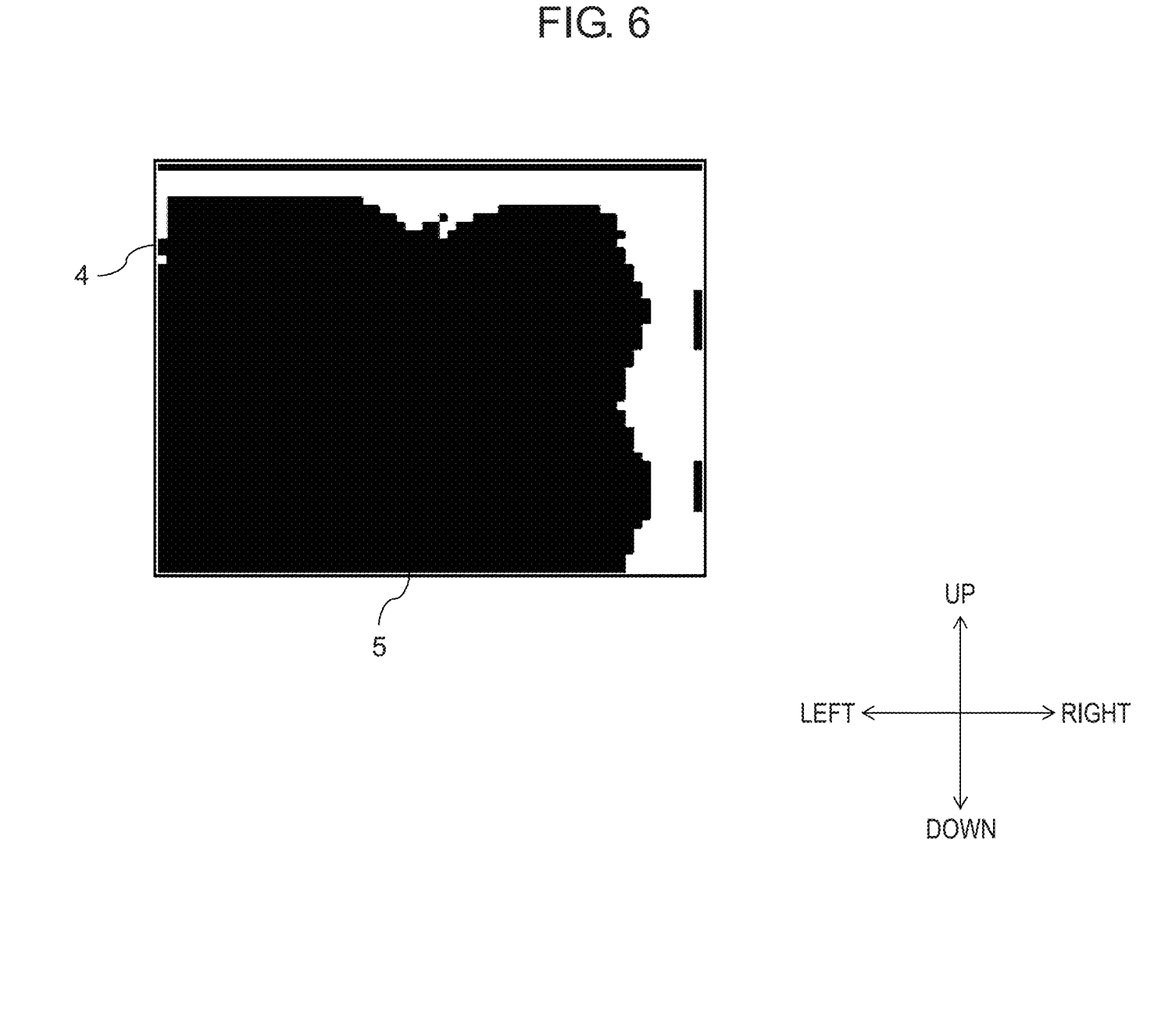
FIG. 6 is a view of an example of a binarized image with the outside light captured.

FIG. 6 is a binarized image with the outside light captured. In an upper central portion and a right portion of passport region 5, the shape of the passport is trimmed under an influence of the outside light.

If the shape detection and the placement orientation determination described with reference to FIG. 4 are performed for this binarized image, it is determined that passport 2 is not placed, though passport 2 is placed.

[1-2. Operation]

Figure 7:
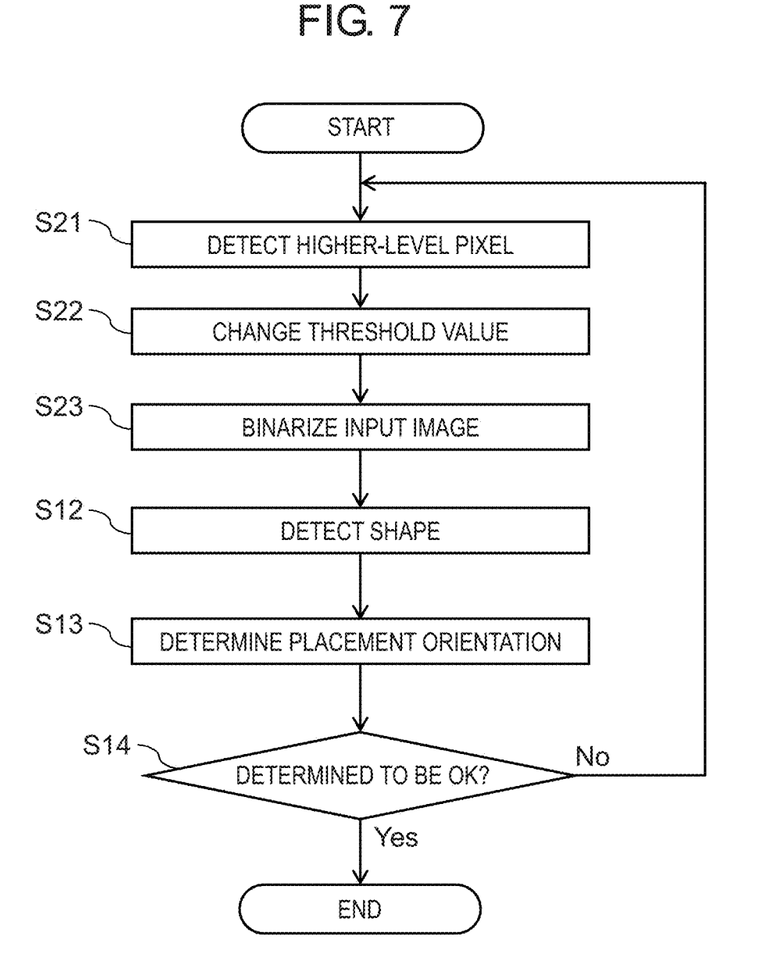
FIG. 7 is a flowchart showing an example of an operation of the placement detection system including processing for suppressing an influence of the outside light.

FIG. 7 is an operation flowchart of a placement detection system including processing for suppressing the influence of the outside light.

First, controller 20 detects a pixel (higher-level pixel 8) with a higher pixel level corresponding to a higher-illumination outside light in the input image obtained by image sensor 1 (S21). In other words, controller 20 identifies higher-level pixel 8 having the pixel level higher than or equal to a predetermined pixel level in the input image. Here, the predetermined pixel level is 240 in the range of 0 to 255.

Controller 20 sets a higher threshold value for the binarization processing of higher-level pixel 8 detected in S21 than the existing value. Controller 20 sets the threshold value of higher-level pixel 8 to 150, for example. Controller 20 performs processing for decreasing the threshold value as a distance from higher-level pixel 8 increases. In other words, controller 20 sets the threshold value of each of target pixels other than higher-level pixel 8 to a lower value than the threshold value of higher-level pixel 8 in accordance with the distance between higher-level pixel 8 and the target pixel. In this manner, controller 20 produces a threshold value table for determining the threshold value in accordance with a pixel position (S22).

Next, controller 20 binarizes the input image by using the produced threshold value table and generates an image that is binarized (binarized image) (S23). In other words, controller 20 binarizes the pixel level of each of the target pixels in accordance with the threshold value of the target pixel to produce the binarized image.

Next, controller 20 detects the shape of passport 2 by using the binarized image (S12).

Based on a result obtained in the shape detection, controller 20 determines whether passport 2 is placed in a predetermined placement orientation (S13).

If a determination result is "Yes", passport 2 is regarded as being placed in the predetermined placement orientation and placement detection processing is ended. If the determination result is "No", the processing returns to a start of the operation flowchart to repeat the placement detection (S14).

Figure 8:
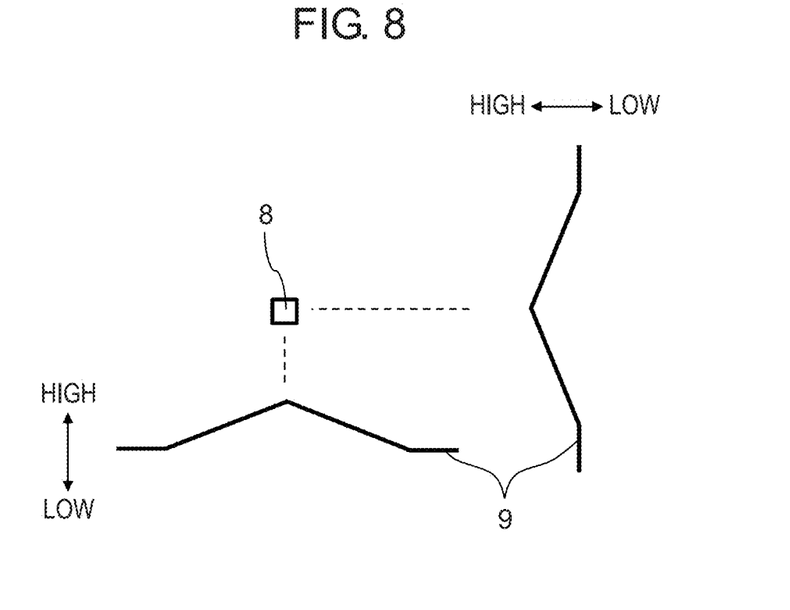
FIG. 8 is an explanatory view of the processing for suppressing the influence of the outside light.

FIG. 8 is an explanatory view of the processing for suppressing the influence of the outside light. With reference to FIG. 8, operations in S21 and S22 in FIG. 7 are described.

In the input image from image sensor 1, controller 20 detects higher-level pixel 8 and sets binarization threshold value 9 of higher-level pixel 8 to a higher value. Controller 20 decreases binarization threshold value 9 as the distance from higher-level pixel 8 increases.

FIG. 8 shows a manner in which binarization threshold value 9 changes in an up-down direction and a left-right direction. As a result of this processing, the threshold value of higher-level pixel 8 becomes higher than the threshold values of the other pixels. As the distance from higher-level pixel 8 increases, the threshold values of the other pixels become lower than the threshold value of the higher-level pixel.

In this manner, controller 20 produces the threshold value table in which the threshold value is determined in accordance with the pixel position.

Here, the pixel level of higher-level pixel 8 is set to 240 or higher in the image having the pixel levels ranging from 0 to 255. In the threshold value table, the highest threshold value is set to 150 and the lowest threshold value is set to 40, for example.

Figure 9:
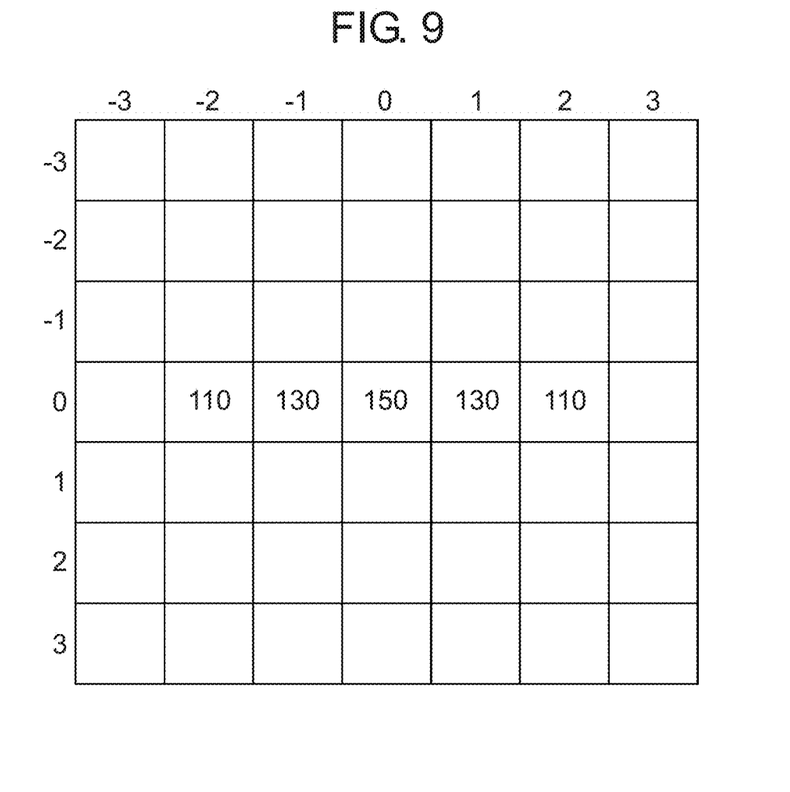
FIG. 9 is a diagram showing an example of a threshold value table.

FIG. 9 shows an example of production of the threshold value table.

If a position of higher-level pixel 8 having the pixel level of 250 is represented by coordinates (0, 0), for example, controller 20 changes binarization threshold value 9 of higher-level pixel 8 from 40 (the existing value) to 150.

Controller 20 sets binarization threshold value 9 of each of pixels at coordinates (1, 0) and coordinates (−1, 0) to 130, for example. Here, the pixels at the coordinates (1, 0) and the coordinates (−1, 0) are the pixels next to higher-level pixel 8.

Controller 20 sets binarization threshold value 9 of each of pixels at coordinates (2, 0) and coordinates (−2, 0) to 110, for example. Here, the pixel at the coordinates (2, 0) is the pixel next to the pixel at the coordinates (1, 0) and the pixel at the coordinates (−2, 0) is the pixel next to the pixel at the coordinates (−1, 0).

In this manner, the threshold value of each of the target pixels closer to higher-level pixel 8 is set to the lower value than the threshold value of higher-level pixel 8 in accordance with the distance from higher-level pixel 8. In this manner, controller 20 produces the threshold value table.

If there is no pixel corresponding to higher-level pixel 8, the threshold values for an entire screen may be set to same values (e.g., 40).

Figure 10:
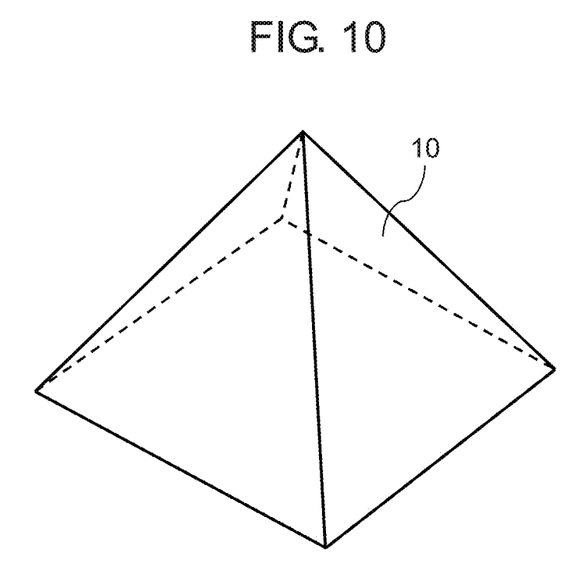
FIG. 10 is an image view of change of the threshold value.

FIG. 10 is an image view of change of the threshold value described with reference to FIG. 8.

In FIG. 10, an apex represents a position of higher-level pixel 8 and the threshold value decreases as the distance from higher-level pixel 8 increases. FIG. 10 is the image view of the threshold value decreased linearly in proportion to the distance from higher-level pixel 8. However, it is essential only that processing for decreasing the threshold value in accordance with the distance from higher-level pixel 8 be performed. Therefore, the threshold value may decrease in an exponential fashion or a concentric fashion. In other words, controller 20 may set the threshold value of each of the target pixels as a linear function of the distance between higher-level pixel 8 and the target pixel. Controller 20 may set the threshold value of each of the target pixels as an exponential function of the distance between higher-level pixel 8 and the target pixel.

Figure 11:
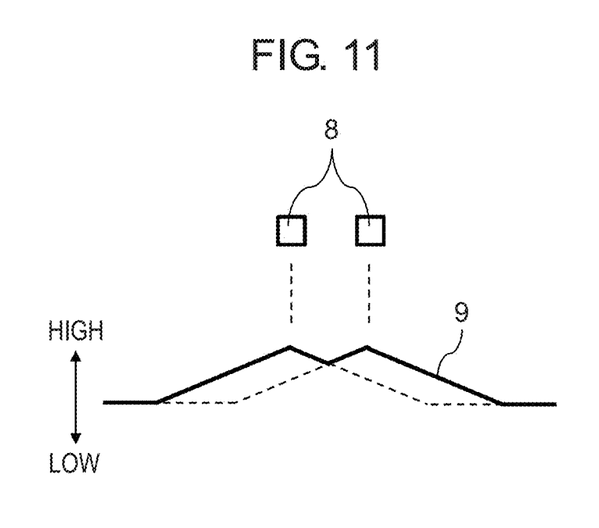
FIG. 11 is an explanatory view of processing when there are a plurality of higher-level pixels.

FIG. 11 is an explanatory view of processing when an input image has a plurality of higher-level pixels 8.

The threshold value decreases from respective pixel positions of two higher-level pixels 8 as centers and higher threshold values are selected in an overlap. This way, it is possible to produce an optimum threshold value table. In other words, controller 20 identifies the different higher-level pixel having a pixel level higher than or equal to the predetermined pixel level (e.g., 240) in the input image and sets a threshold value of the different higher-level pixel. Here, controller 20 sets the threshold value of the different higher-level pixel to 150, for example. Controller 20 calculates an alternative threshold value in accordance with a distance between the different higher-level pixel and each of the target pixels. Controller 20 sets the threshold value of the target pixel to the alternative target value if the alternative threshold value is larger than the already-set threshold value of the target pixel.

Figure 12:
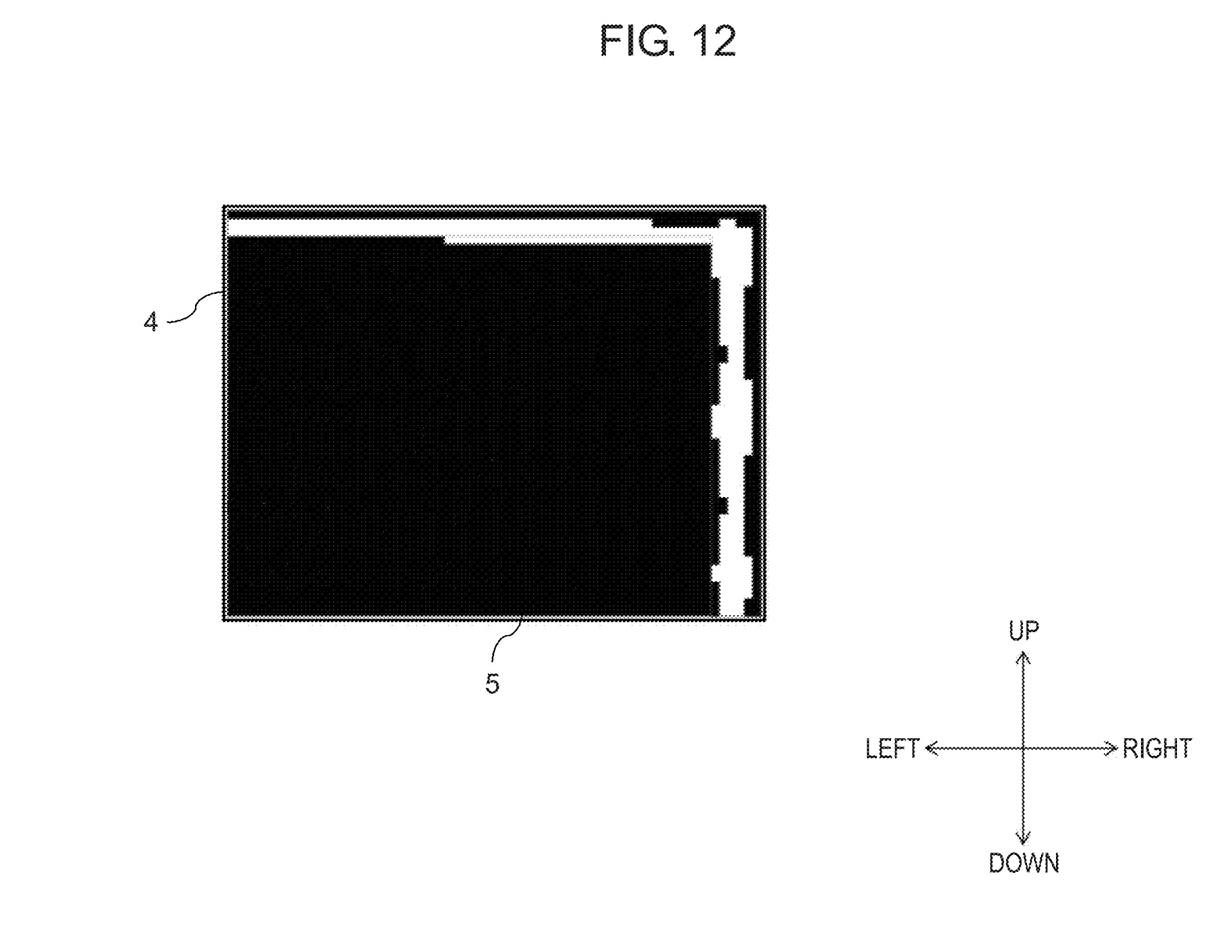
FIG. 12 is a view of an example of a binarized image after the processing for suppressing the influence of the outside light.

FIG. 12 shows a binarized image after the processing for suppressing the influence of the outside light, which is an example of the image after the binarization processing in S23 in FIG. 7.

Pixels having raised pixel levels around the outside light are binarized. At this time, the closer the pixel is to the outside light, the higher threshold value is used. As a result, improvement of the shape of passport 2 can be seen in the example in FIG. 12 as compared with passport region 5 partially trimmed in FIG. 6.

This way, it is possible to detect that passport 2 is placed in placement region 4 by suppressing the influence of the outside light.

Figure 13:
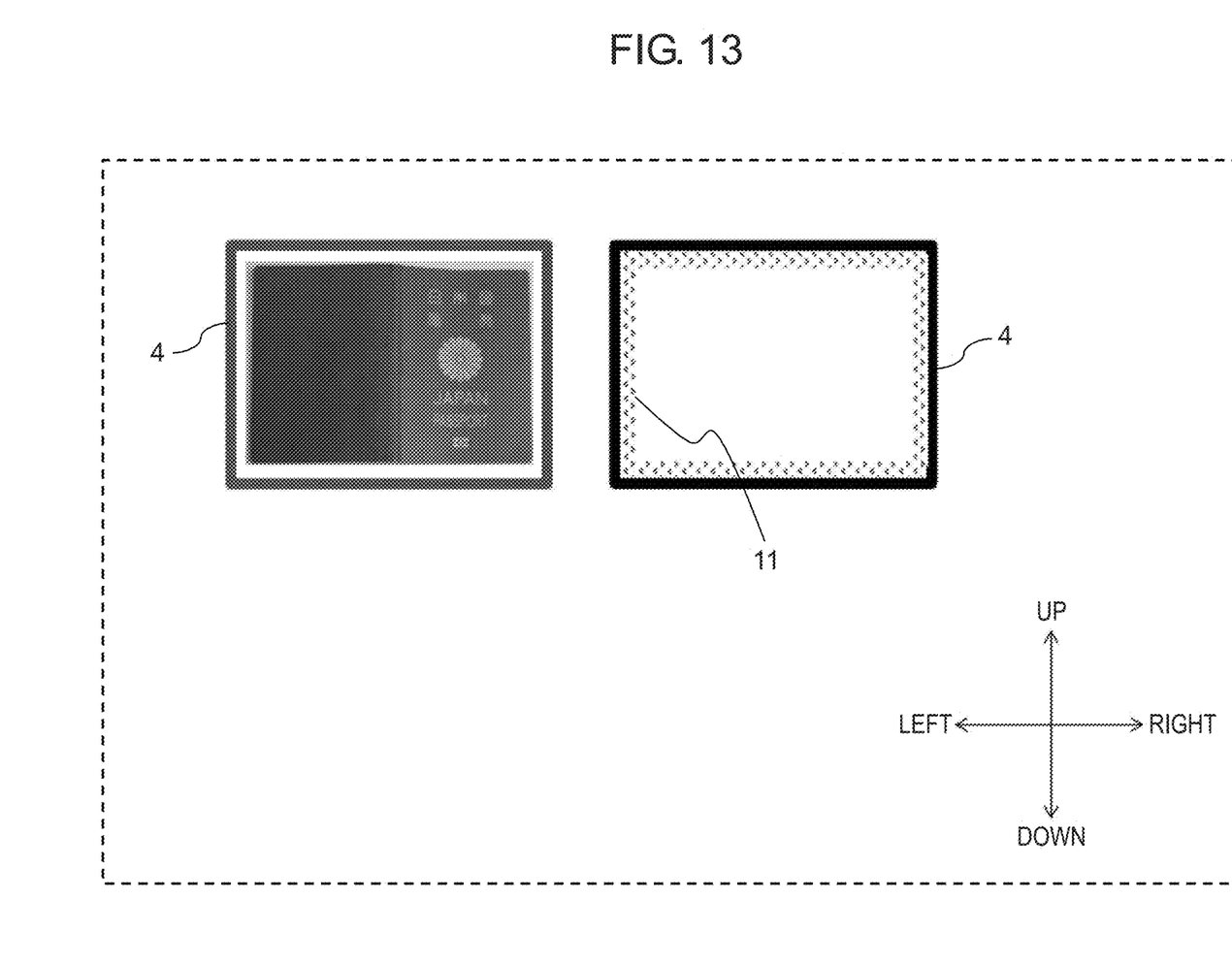
FIG. 13 is an explanatory view of an example of a higher-level pixel detection region in the processing for suppressing the influence of the outside light.

FIG. 13 is an explanatory view of an example of a higher-level pixel detection region in the processing for suppressing the influence of the outside light.

The higher-level pixels resulting from the outside light influence a portion of passport region 5 (see FIG. 3) close to a periphery of passport 2. Therefore, it is possible to limit higher-level pixel detection region 11 where the higher-level pixels are detected to the periphery of passport 2.

For example, in a case of the input image including 64 pixels in a horizontal direction and 48 pixels in a vertical direction, if a width of an empty region includes about four pixels when passport 2 is placed along an end of placement region 4, a width of higher-level pixel detection area 11 may be set to four pixels.

[1-3. Effects and Others]

As described above, in the present first exemplary embodiment, it is possible to appropriately detect the shape of the placed object even in an environment where the outside light illuminates the placement region. As a result, it is necessary only that an object to be detected be placed in the placement region without a cover in contrast to conventional operations such as slipping passport 2 or the like under a cover or holding down passport 2 or the like with a lid. Therefore, it is possible to provide the system that can be easily used by a user.

The above-described exemplary embodiment exemplifies a technique of the present disclosure. Therefore, the exemplary embodiment may be variously modified within a scope of the claims or a scope of equivalents of the claims. Alternatively, one or some components of the exemplary embodiment may be replaced by other component(s), within a scope of the claims or a scope of equivalents of the claims. Alternatively, one or some components may be added to the exemplary embodiment, within a scope of the claims or a scope of equivalents of the claims. Alternatively, one or some components may be eliminated from the exemplary embodiment, within a scope of the claims or a scope of equivalents of the claims.

INDUSTRIAL APPLICABILITY

The present disclosure can be applied to a placement detection system that detects a shape of an object under an influence of an outside light or the like. For example, the present disclosure can be applied to a passport reader that determines whether a placement orientation of passport 2 is appropriate when the object is passport 2.

What is claimed is:

1. A placement detection system comprising:
   a placement table;
   an imaging device that images an object placed on the placement table through the placement table to generate an input image; and
   a control device that receives the input image,
   wherein the control device
   identifies a higher-level pixel having a pixel level higher than or equal to a predetermined pixel level in the input image,
   sets a threshold value of the higher-level pixel,
   sets a threshold value of a target pixel other than the higher-level pixel to a lower value than the threshold value of the higher-level pixel in accordance with a distance between the higher-level pixel and the target pixel,
   binarizes a pixel level of the target pixel in accordance with the threshold value of the target pixel to produce a binarized image, and
   detects a shape of the object by using the binarized image.

2. The placement detection system according to claim 1, wherein the control device sets the threshold value of the target pixel as a linear function of the distance.

3. The placement detection system according to claim 1, wherein the control device sets the threshold value of the target pixel as an exponential function of the distance.

4. The placement detection system according to claim 1, wherein the pixel levels of the higher-level pixels of the input image range from 0 to 255.

5. The placement detection system according to claim 1, wherein the control device
   identifies a different higher-level pixel having a pixel level higher than or equal to the predetermined pixel level,
   sets a threshold value of the different higher-level pixel,
   calculates an alternative threshold value in accordance with a distance between the different higher-level pixel and the target pixel, and
   sets a threshold value of the target pixel to the alternative threshold value if the alternative threshold value is larger than the set threshold value of the target pixel.

6. The placement detection system according to claim 1, wherein the placement table is a transparent plate.

\* \* \* \* \*